United States Patent [19]
Cherel

[11] 3,722,338
[45] Mar. 27, 1973

[54] APPARATUS AND PROCESS FOR THE TREATMENT OF SPENT FUEL

[75] Inventor: Guy Henry Cherel, Bougival, France

[73] Assignee: Saint-Gobain Techniques Nouvelles, Courbevoie, France

[22] Filed: Feb. 25, 1970

[21] Appl. No.: 13,946

[52] U.S. Cl. .....................83/278, 83/282, 83/390, 83/622, 83/636, 83/925 R
[51] Int. Cl. ...................B23d 15/04, B23d 35/00
[58] Field of Search........83/277, 282, 390, 622, 636, 83/694, 697, 925 R, 683

[56] References Cited

UNITED STATES PATENTS 3,122,038   2/1964   Juras..................................83/622 X Primary Examiner—James M. Meister
Attorney—John L. Seymour

[57] ABSTRACT

Apparatus for shearing into sections or fragments, the tubes containing nuclear fuel of combustion elements, and which are secured together by lateral, longitudinally-spaced tie rods or bands. After removal of the inert ends with which each element is commonly provided, the bundle of tubes, sans ends, is moved longitudinally by steps of 20 to 30 mm each, into a shearing apparatus wherein after each step the bundle of tubes is clamped to a fixed stop or surface and the projecting ends are sheared off by a reciprocating shearing tool to thus form a number of fragments of tube and fuel each. In the prior art when two successive shearing cuts were on opposite sides respectively, of a tie band, the band still held the cut fragments together in a unitary mass of excessive size, capable of clogging the pipes leading to the tank in which the fuel or the metal of the tubes is dissolved. To obviate that disadvantage the present invention incorporates into the reciprocating shearing tool, a shearing tooth projection fixed therewith and which is spaced ahead of the shearing edge of the tool in the direction of the working stroke. The construction is such that when a tie rod or band is advanced into position to be sheared off on the next stroke of the shearing tool, the projection first engages and shears the band to thus allow the subsequently-sheared fragments of fuel and tubes to disintegrate or separate as the tool completes its shearing stroke.

32 Claims, 29 Drawing Figures

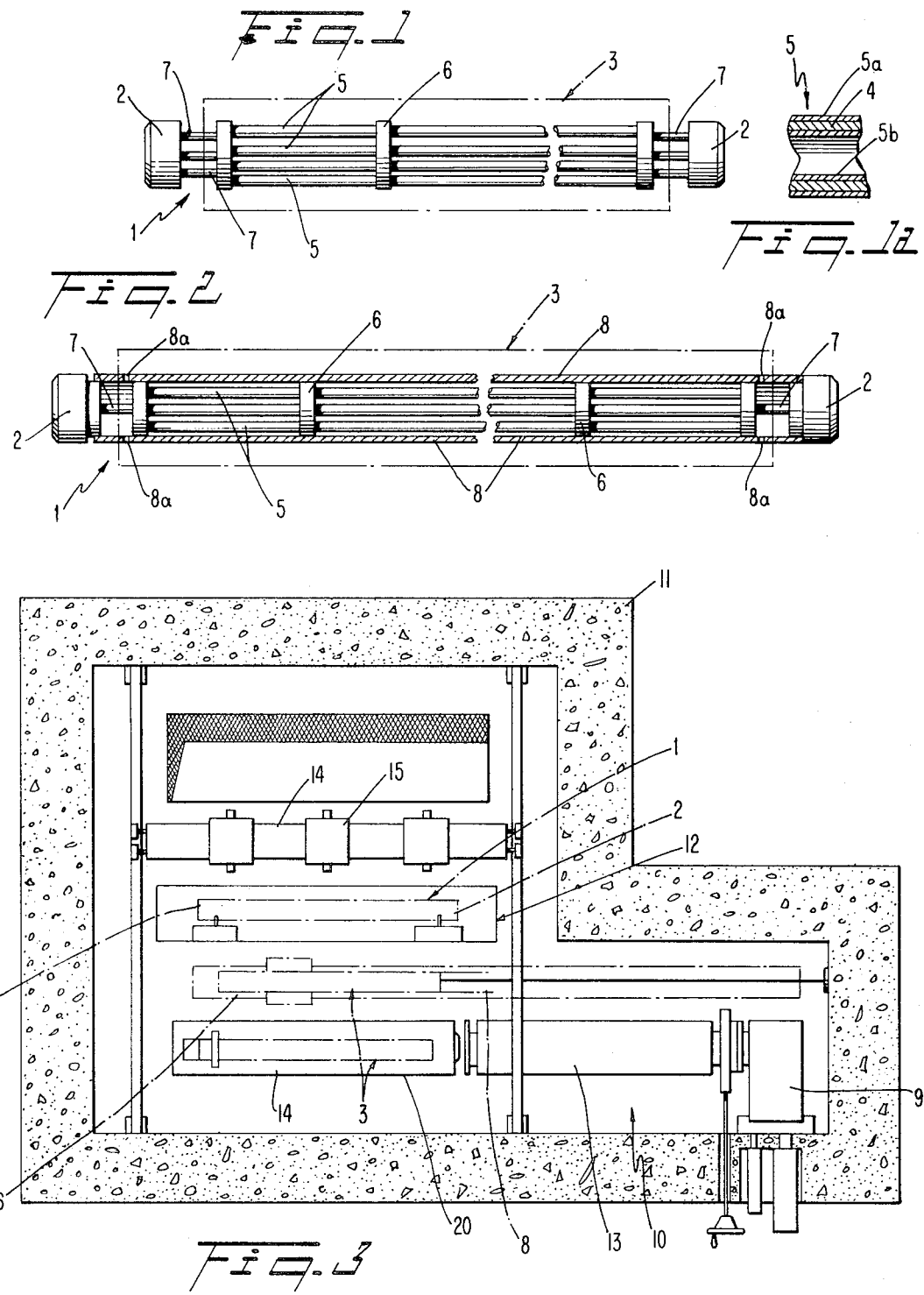

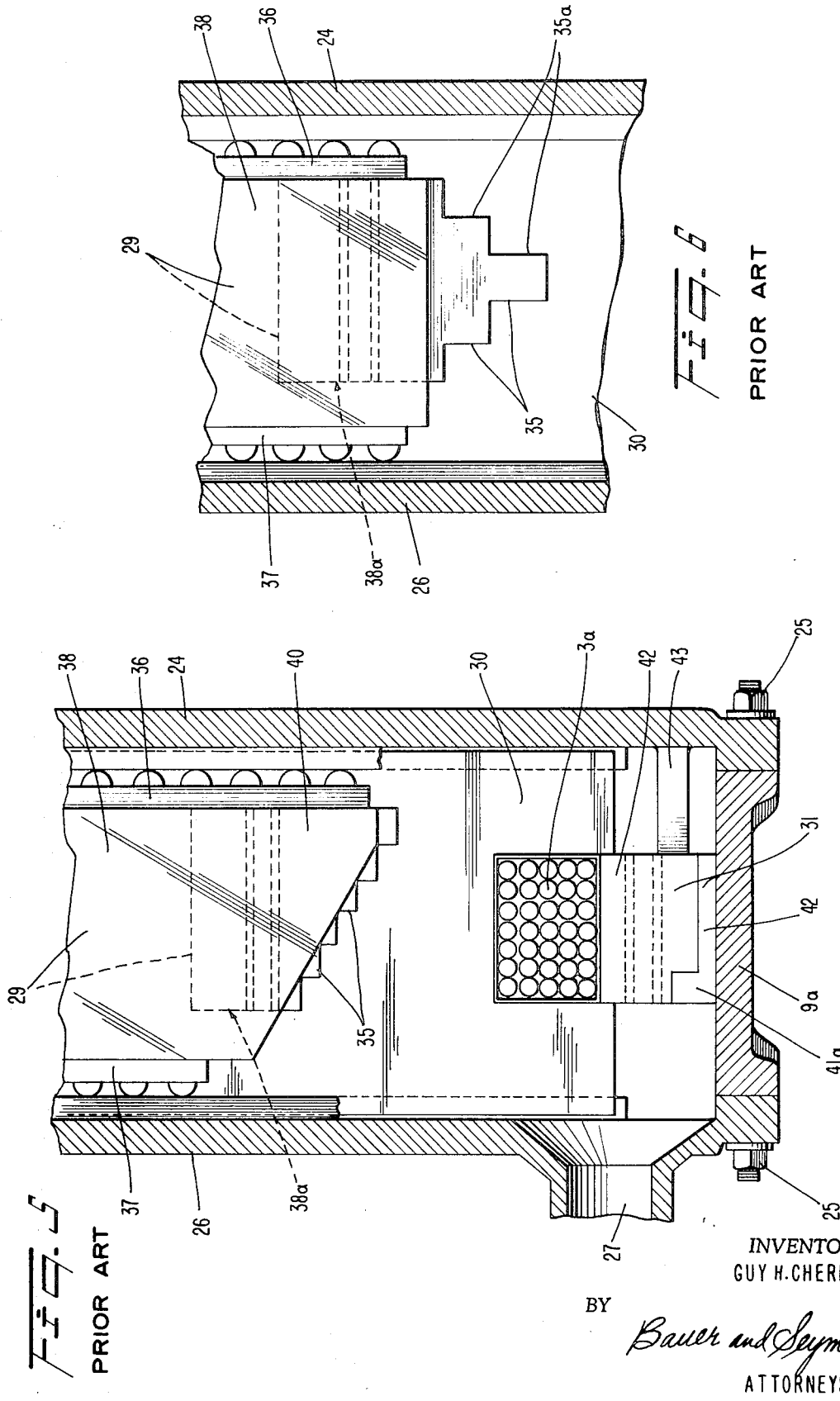

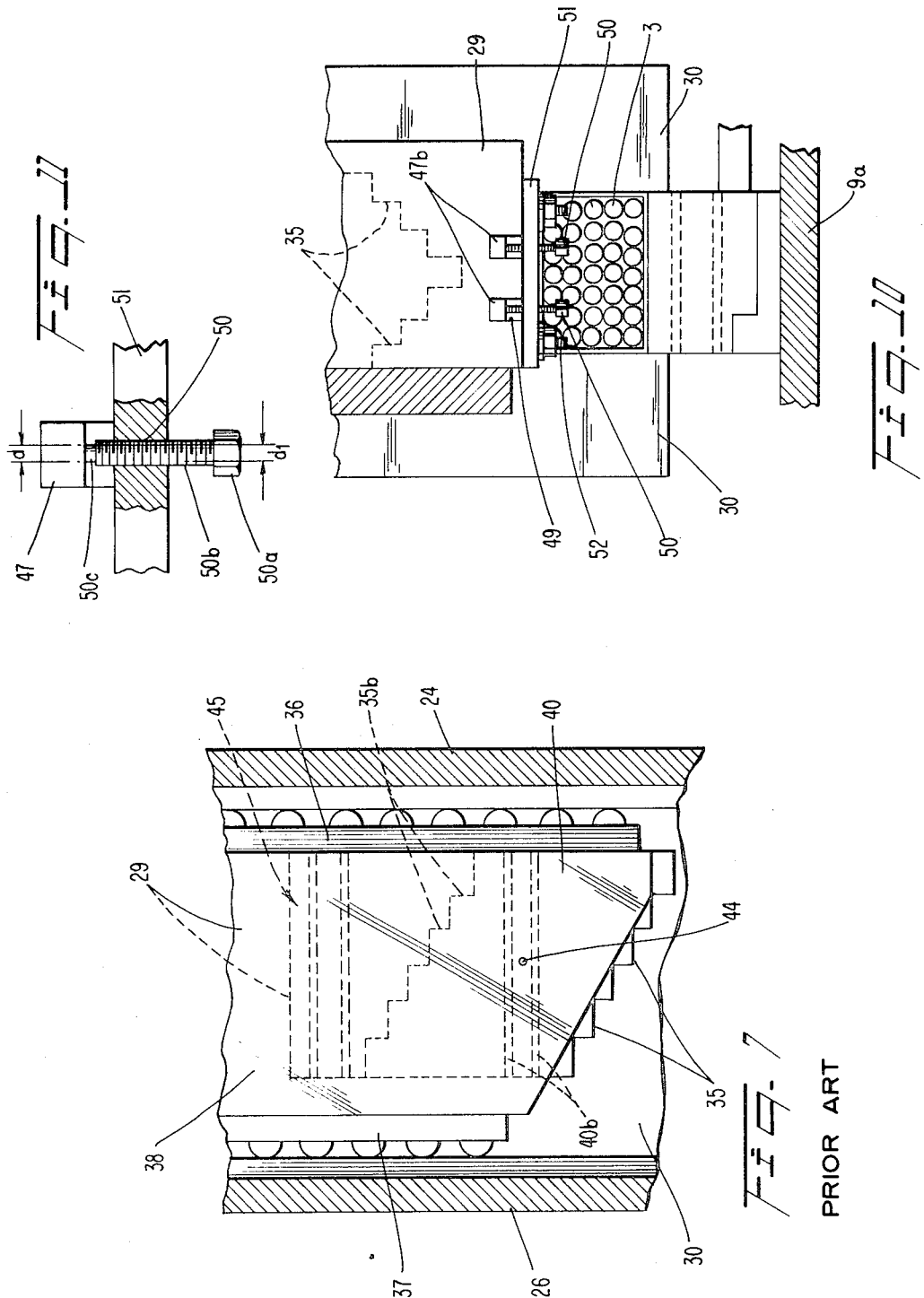

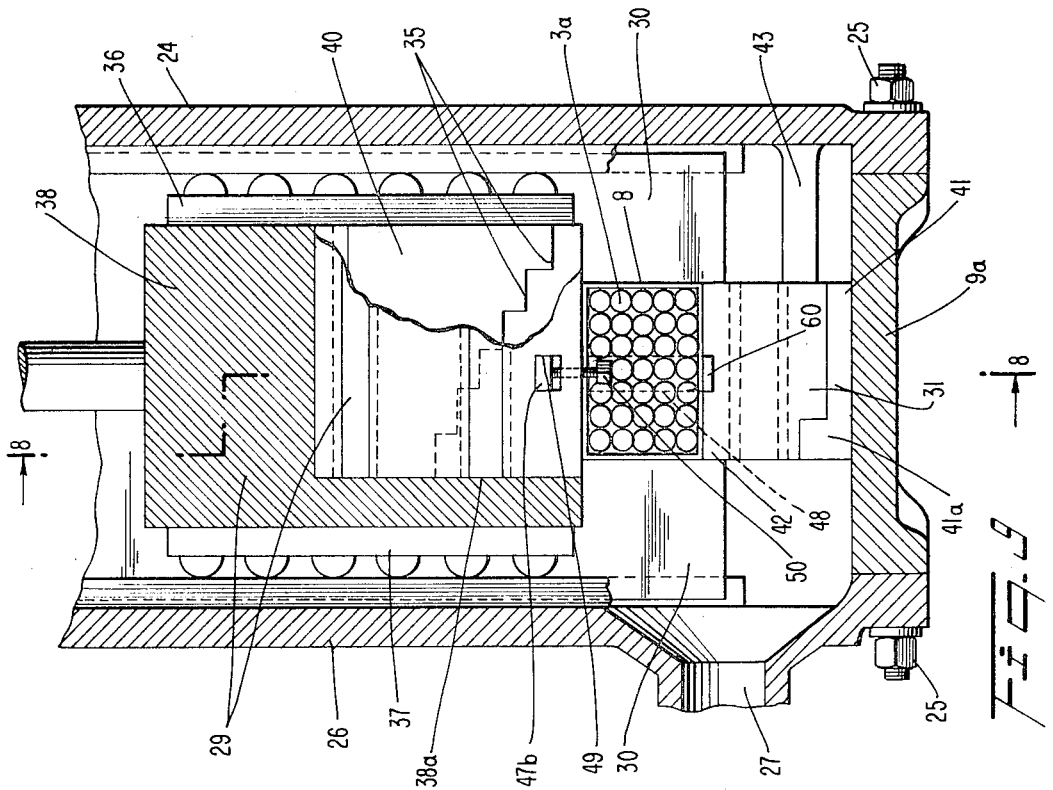
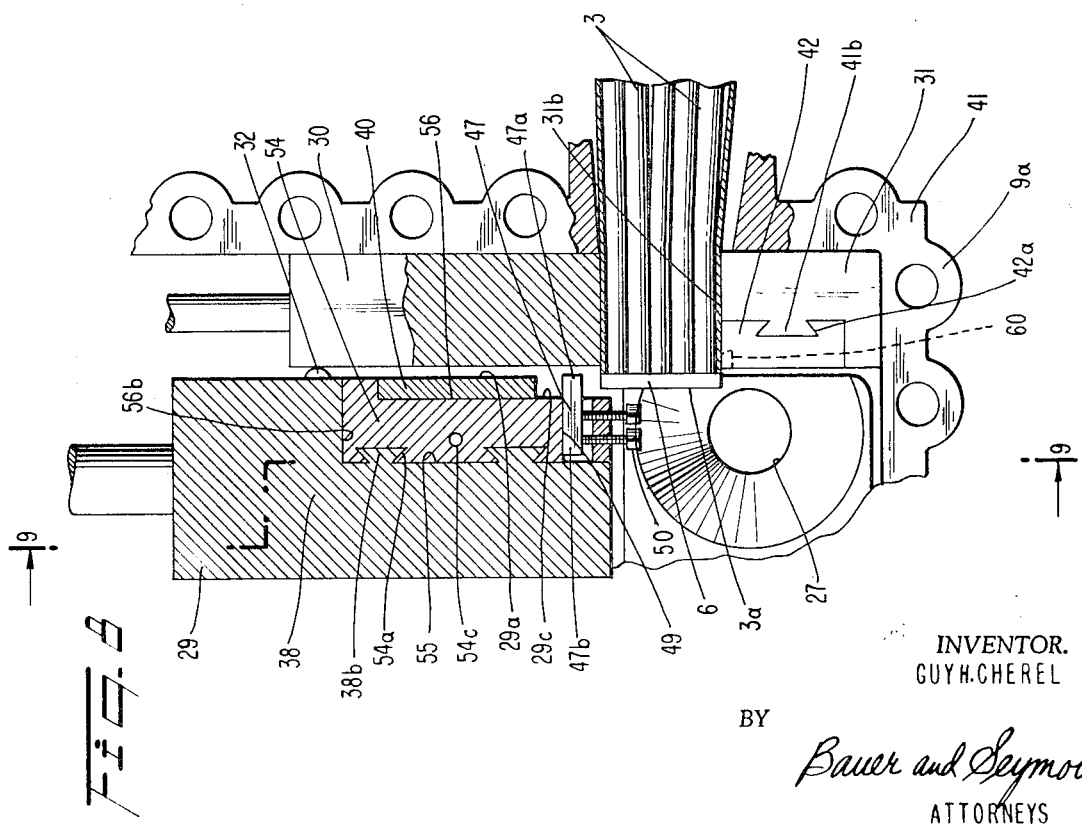

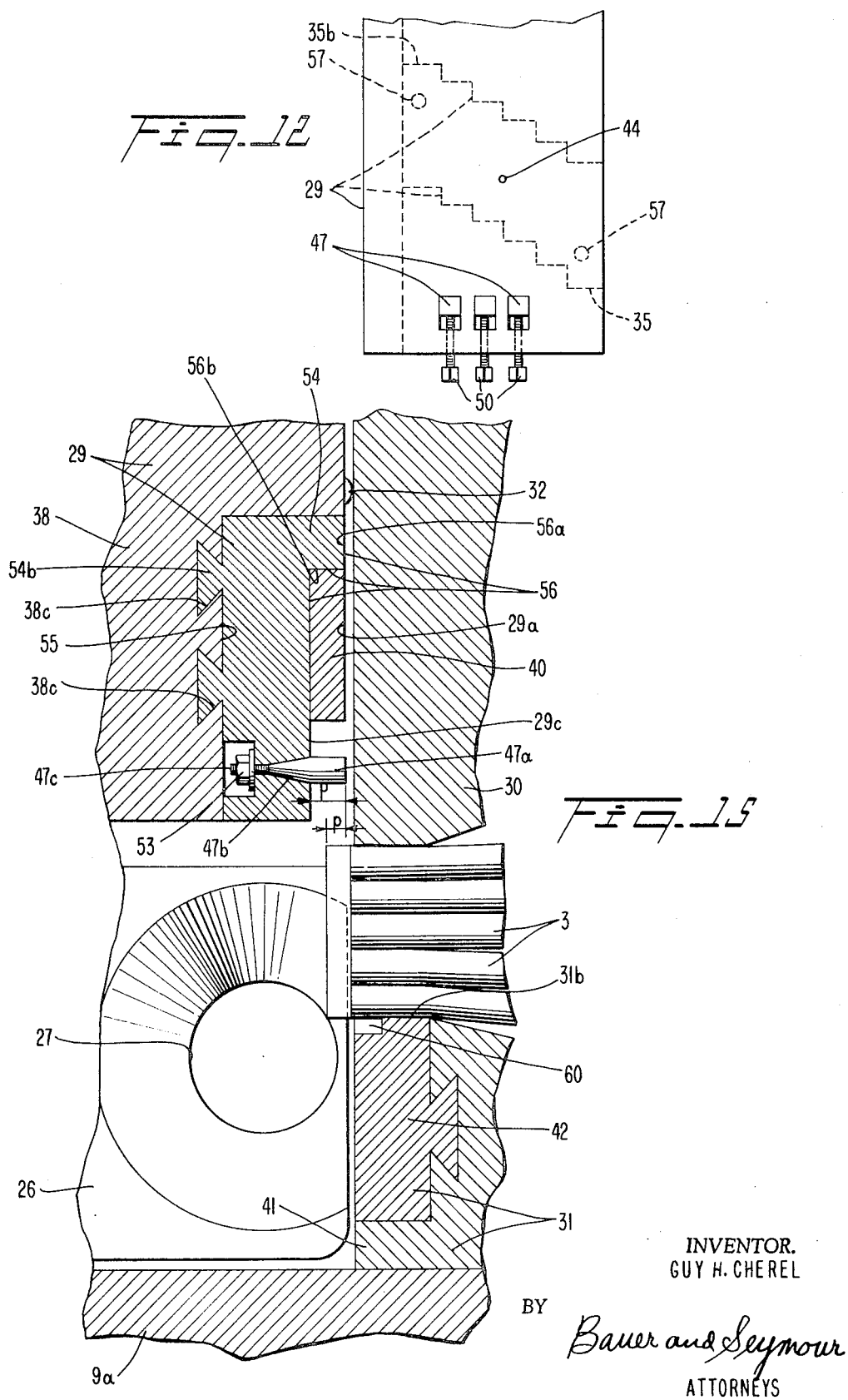

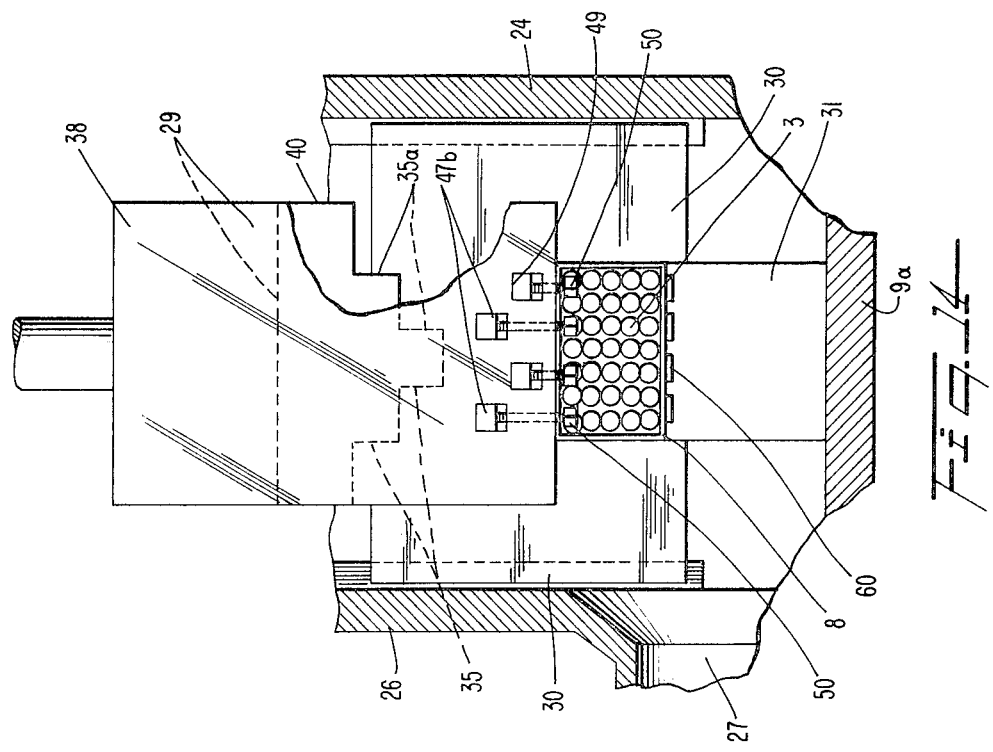
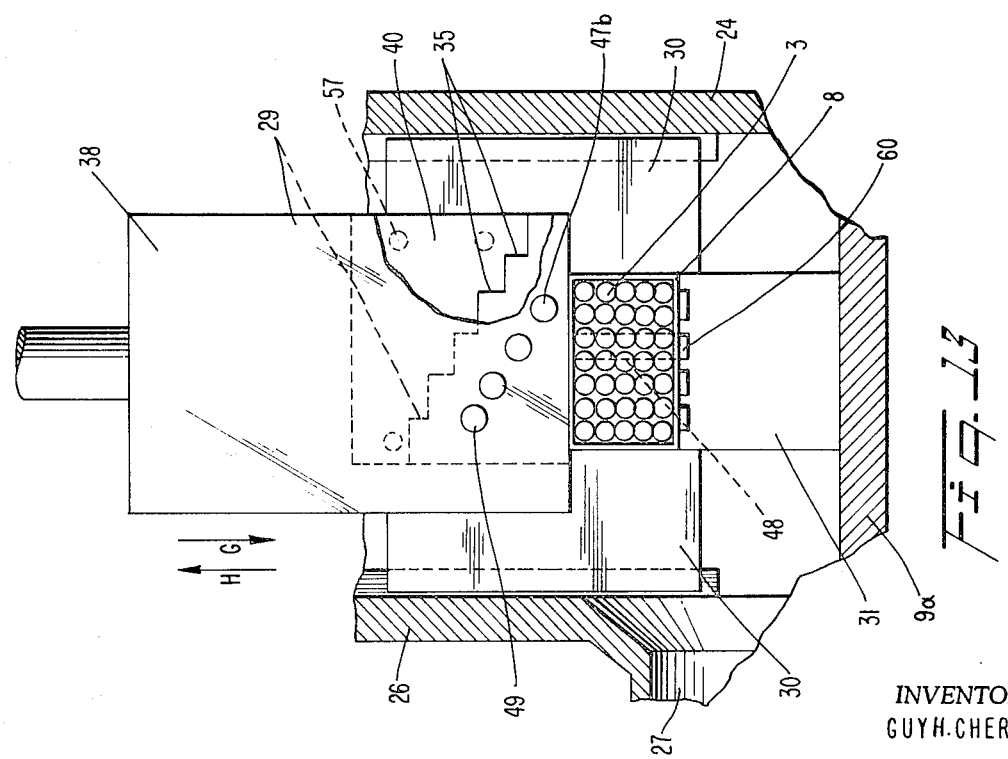

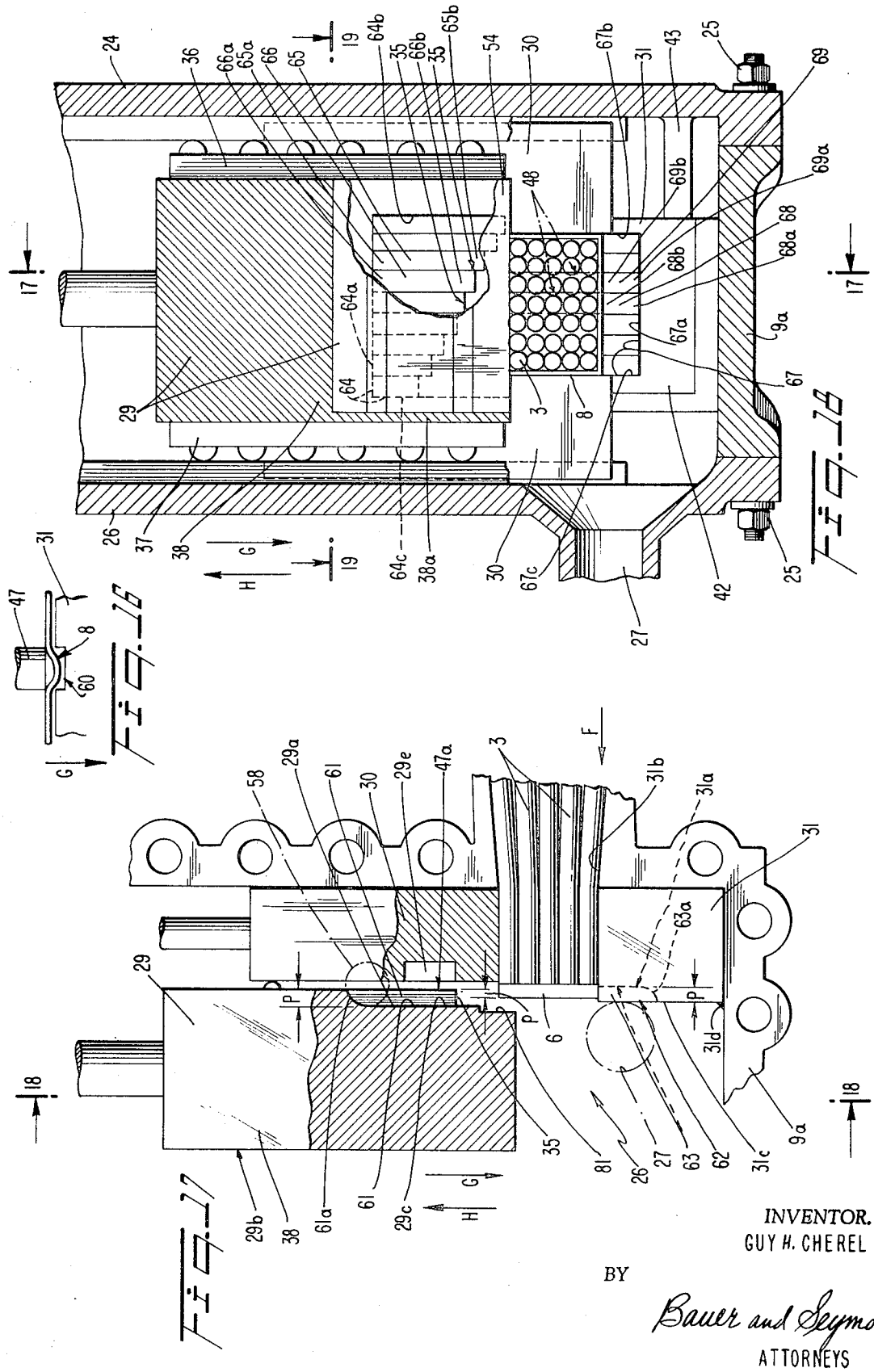

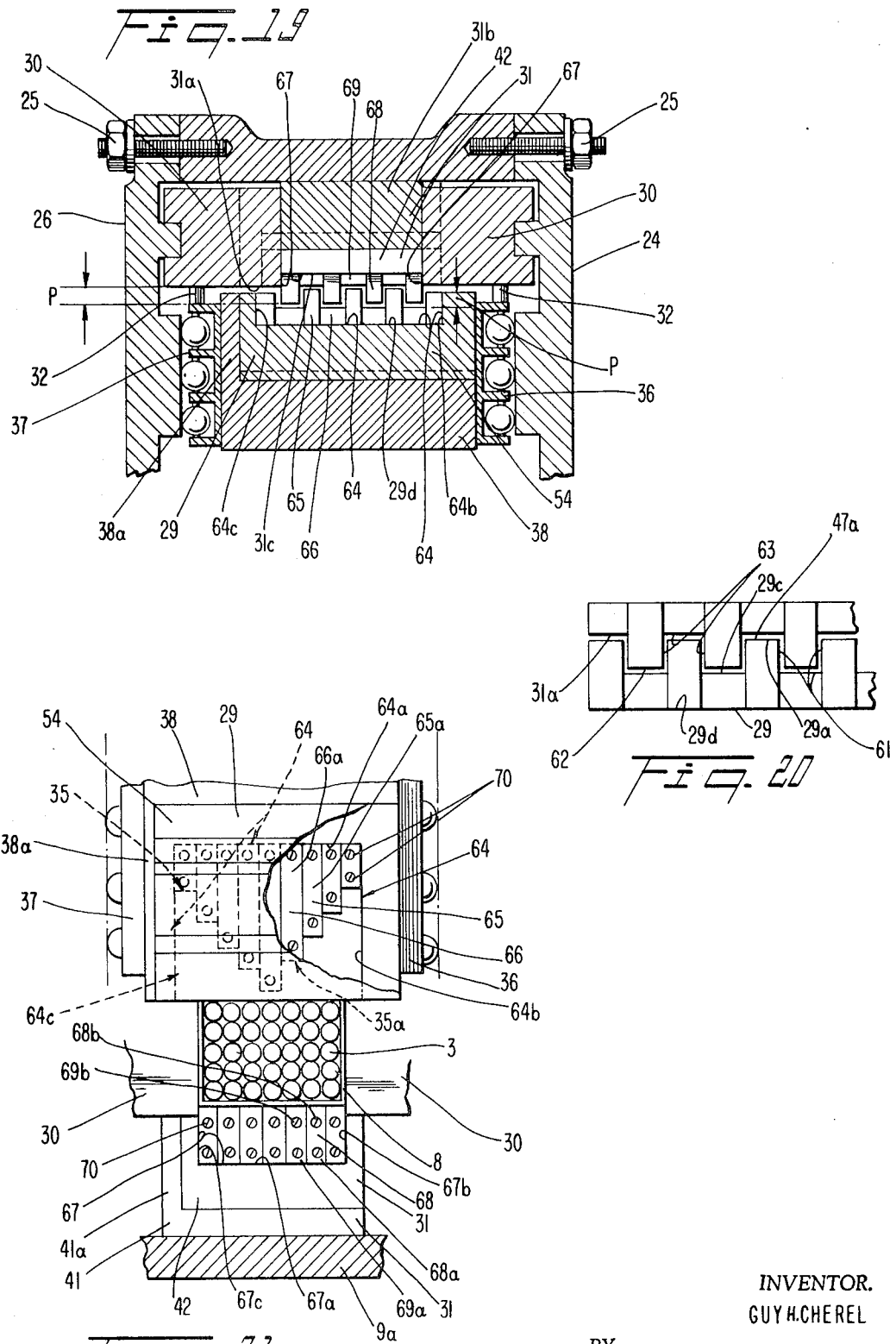

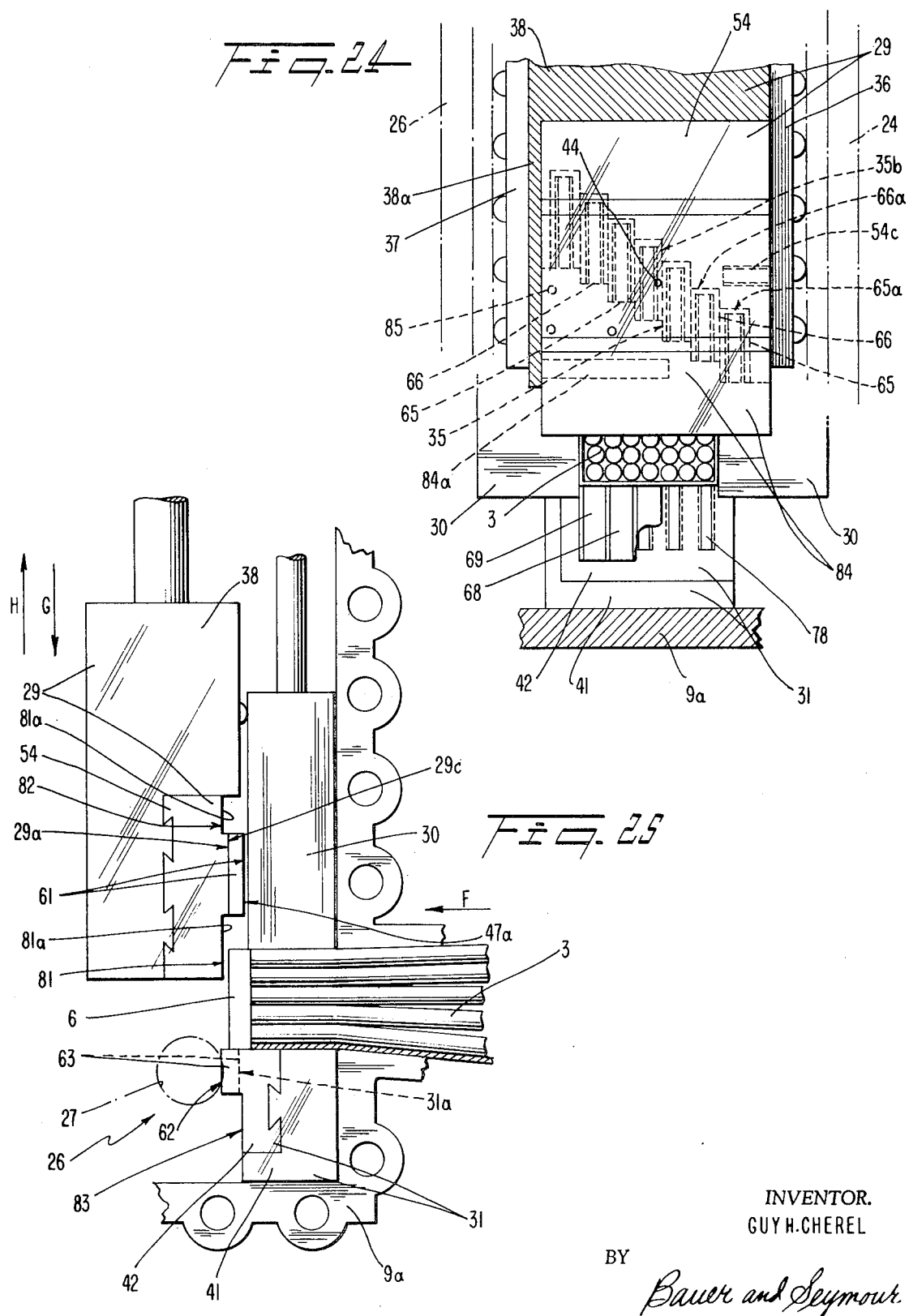

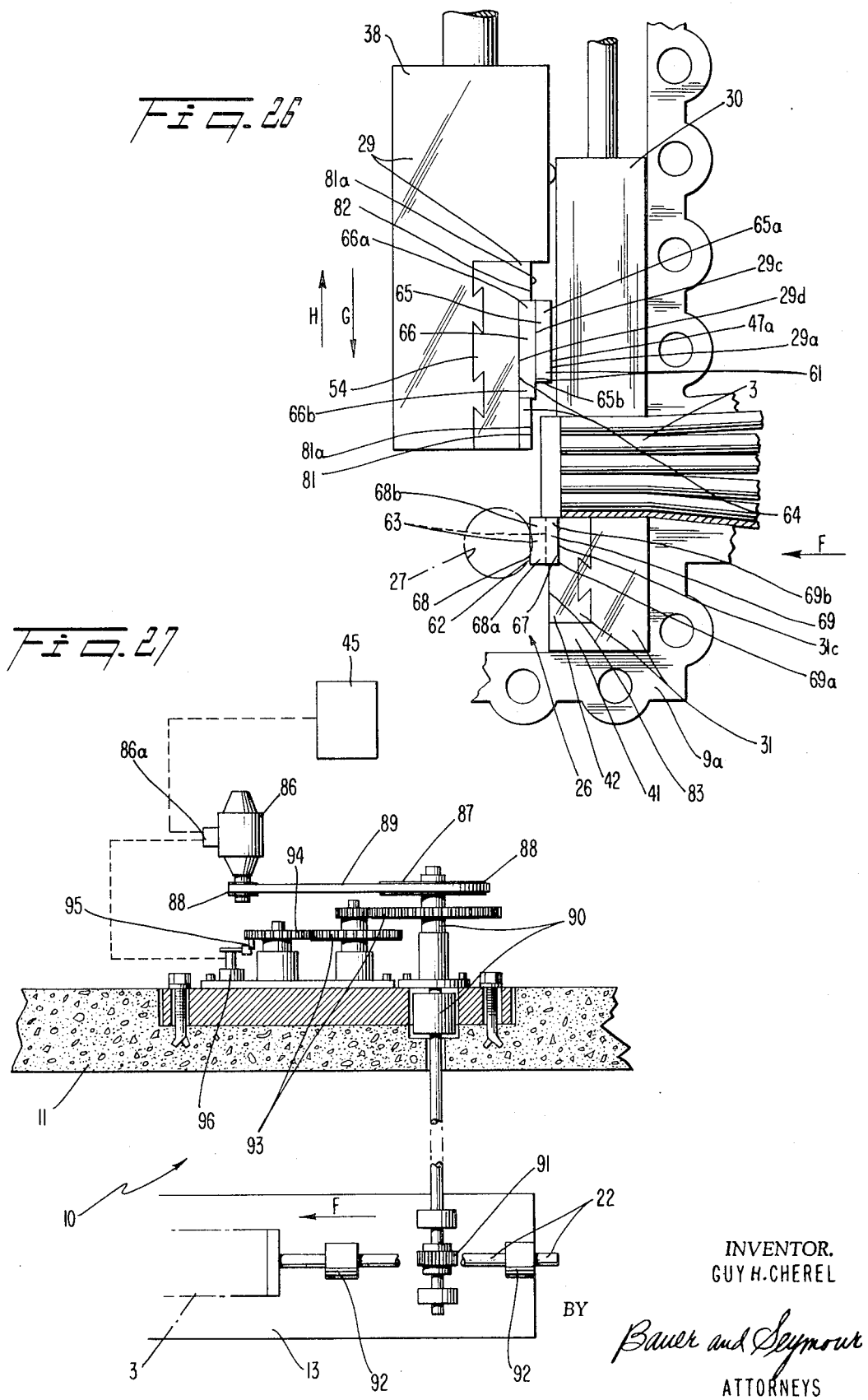

INVENTOR.
GUY H. CHEREL
BY
Bauer and Seymour
ATTORNEYS

APPARATUS AND PROCESS FOR THE TREATMENT OF SPENT FUEL

In order to improve heat transfer in atomic piles, it has become necessary to fabricate combustible elements consisting of low cross-section cartridges, e.g. on the order of one square centimeter, or even a cartridge having complex cross-section, having for example, an external sheath and an internal sheath designed to be in contact with a cooling medium. Thus, it is convenient to use cartridges having a diameter on the order of one centimeter, filled with combustible nuclear powder made of natural or enriched uranium oxide, and cartridges whose outer and inner casings enclose between them a nuclear combustible material made of a metal or a fissionable alloy.

After remaining in the piles, the irradiated elements must be treated, in order to restore a predetermined purity to the combustible nuclear material and recover fission products having commercial value. Since it is practically impossible to extract this combustible material from the sheath or cartridge by mechanical means, a chemical separation process is generally employed, in which the cartridges or nuclear combustible material is selectively dissolved in a suitable bath present in a dissolver, or a battery of dissolvers. For example, this bath may be nitric acid when the stainless steel or zirconium alloy cartridges contain a natural or enriched uranium oxide powder, or may even be sodium hydroxide when the aluminum or magnesium alloy casings enclose between them, uranium or one of its alloys. It is, nevertheless, essential to supply the cartridges as sections or fragments, in order to allow the bath to make contact with the combustible material, as well as to reduce the size of the dissolver bath.

Since an element consists of, in addition to cartridges connected by lateral tie rods in a bundle comprising the element component, two inert ends designed to ensure emplacement in the atomic pile, we begin by simultaneously or successively removing these ends in a mechanical saw, the cartridges making up the body of the element remaining interconnected in the bundle, due to the lateral tie rods. This bundle is then fed to a shearing apparatus having a unit connected to a dissolver or series of dissolvers, by means of a series of connected pipes. The apparatus comprises a hold-down plate and a tool conveniently activated by jacks and mounted on the body of the shears, in order to permit them to slide in a predetermined direction, a stop attached to the shears and a feeding device serving to cause the cartridge bundle to travel step by step a predetermined path, e.g. 20—30 mm. It should be noted, that in prior art shears, the tool has a stepped ramp inclined to the above-mentioned direction of slide and bordered by a face plane-situated with respect to the hold-down clamp.

Once the cartridge bundle comprising the element is pressed between the hold-down plate and the stop, the tool, activated by the jack, cuts the cartridges into sections or fragments, these sections then falling via the connecting pipe-line system into the dissolver.

It is important to note, however, that when the tool cuts the cartridge bundle at locations in front of and behind a lateral tie rod, as well as at the location of this tie rod, said tie rod continues to interconnect the cartridge sections lying between those locations and thus results in a formation of an essentially unitary mass capable of obstructing the dissolver or its connecting pipe-line system. Moreover, if the dissolver consists of a conveyor passing into the bath of corrosive liquid, the above-mentioned mass may be thereby removed from the bath before the nuclear material initially forming a part thereof, has been completely dissolved.

These disadvantages are further aggravated if it is desired to fragmentize an element whose cartridge bundle is surrounded by a sleeve because each time the tool cuts into this jacket it forms a ring surrounding the cartridge section.

It has been found that suitable processing equipment designed to employ the above-mentioned chemical process for separating these elements should embody, in addition to a mechanical saw and a conventional shears, a device for separating the cartridge bundle from the sleeve, after removal of the inert ends of the element in the mechanical saw.

The present invention is designed to obviate the aforementioned disadvantages.

Its object is a shearing apparatus, characterized essentially by the fact that the face of the tool located opposite the hold-down plate consists of at least one projecting and one concave part, separated from each other by a distance greater than that of the each individual step by which the feed device causes the element to travel into the shears.

The projecting part of the invention tool permits it to cut into the body of the combustible element to a depth greater than the path over which the feed device travels. This means, that when the tool cuts the element in front of and behind a lateral tie rod, or even at the location of a tie rod, said tie rod will be separated into at least two fragments, in the same way as the aforementioned mass of cartridge fragments. The cartridge fragments otherwise encircled and bound together by the tie rod, are thus released for disintegration into discrete pieces.

Similarly, the present invention shear tool permits separation of the sleeve ring cut in the body of the element, into at least two fragments, when its cartridge bundle is surrounded by a jacket.

Thus, danger of obstructing the dissolvers or their pipe-line systems extending from the shears is eliminated, as well as the danger of incomplete dissolution of combustible nuclear material or cartridges when the present invention shear tool has a predetermined number of projecting parts as aforesaid.

The present invention also covers a processing installation comprising a mechanical saw, a shears as described above and a dissolver filled with a corrosive liquid bath. This kind of installation, in effect, permits application of the aforementioned chemical separation process — consisting of selectively dissolving the cartridges or combustible nuclear material in a corrosive liquid bath present in the dissolver — as well as to elements devoid of jackets or elements having a jacket surrounding the cartridge bundle, without the necessity of adding a disassembling device to the mechanical saw and the invention shears.

The invention will become clear to those skilled in the art, after a study of the following detailed description, in connection with the accompanying drawing wherein:

FIG. 1 is a view of one combustible element with parts removed to disclose the tubes and the tie rods connecting them;

FIG. 1a is a detail view showing to an enlarged scale a longitudinal section of one of the tubes;

FIG. 2 is a view generally corresponding to FIG. 1, showing a combustible element equipped with a jacket;

FIG. 3 is a schematic plan view of a conventional or prior art arrangement of an installation for handling, preliminarily treating, and transporting the elements into the shearing apparatus;

FIG. 5 is a detail sectional view to an enlarged scale, of parts of FIG. 4, taken in a plane identified by line 5 — 5, FIG. 4;

FIG. 6 shows a conventional cutting tool having two reverse inclined sloped steps;

FIG. 7 shows another shears having two interchangeable inclined sloped steps;

FIG. 8 is a plan view partly in section, taken in a plane identified by line 8 — 8, FIG. 9, of shearing apparatus embodying the invention;

FIG. 9 is a sectional view with parts removed, and taken in a plane identified by line 9 — 9, FIG. 8;

FIG. 10 shows an elevation of the invention shears;

FIG. 11 is a detail view to a scale enlarged over FIG. 10, of means for releasably and detachably securing one tooth in place;

FIG. 12 is an elevation of a variant of the element shown in FIG. 10;

FIG. 13 shows a first variation of the device of FIG. 9;

FIG. 14 shows a second variation of the device of FIG. 9;

FIG. 15 represents a third variation of the device shown in FIG. 9;

FIG. 16 is a diagrammatic view illustrating operation of the device according to FIGS. 8, 9, 13 or 14;

FIG. 17 is a partly plane, partly cross-sectional view along line 17—17 of FIG. 18;

FIG. 18 is a cross-sectional view along line 18—18 of FIG. 17;

FIG. 19 is a cross-sectional view along line 19—19 of FIG. 18;

FIG. 20 shows some of the bars attached to the tool and the shears stop illustrated in FIG. 18;

FIG. 21 shows a variant of the tool and the stop of FIG. 18;

FIG. 24 is a variant of the device of FIG. 23;

FIG. 25 shows a first variant of the element of FIG. 18;

FIG. 26 illustrates a second variant of the element of FIG. 18;

FIG. 27 is a detail plan view, partly in section, of mechanism for feeding each nuclear element step by step into the shearing apparatus as schematically shown upon FIG. 4.

Figure 4:
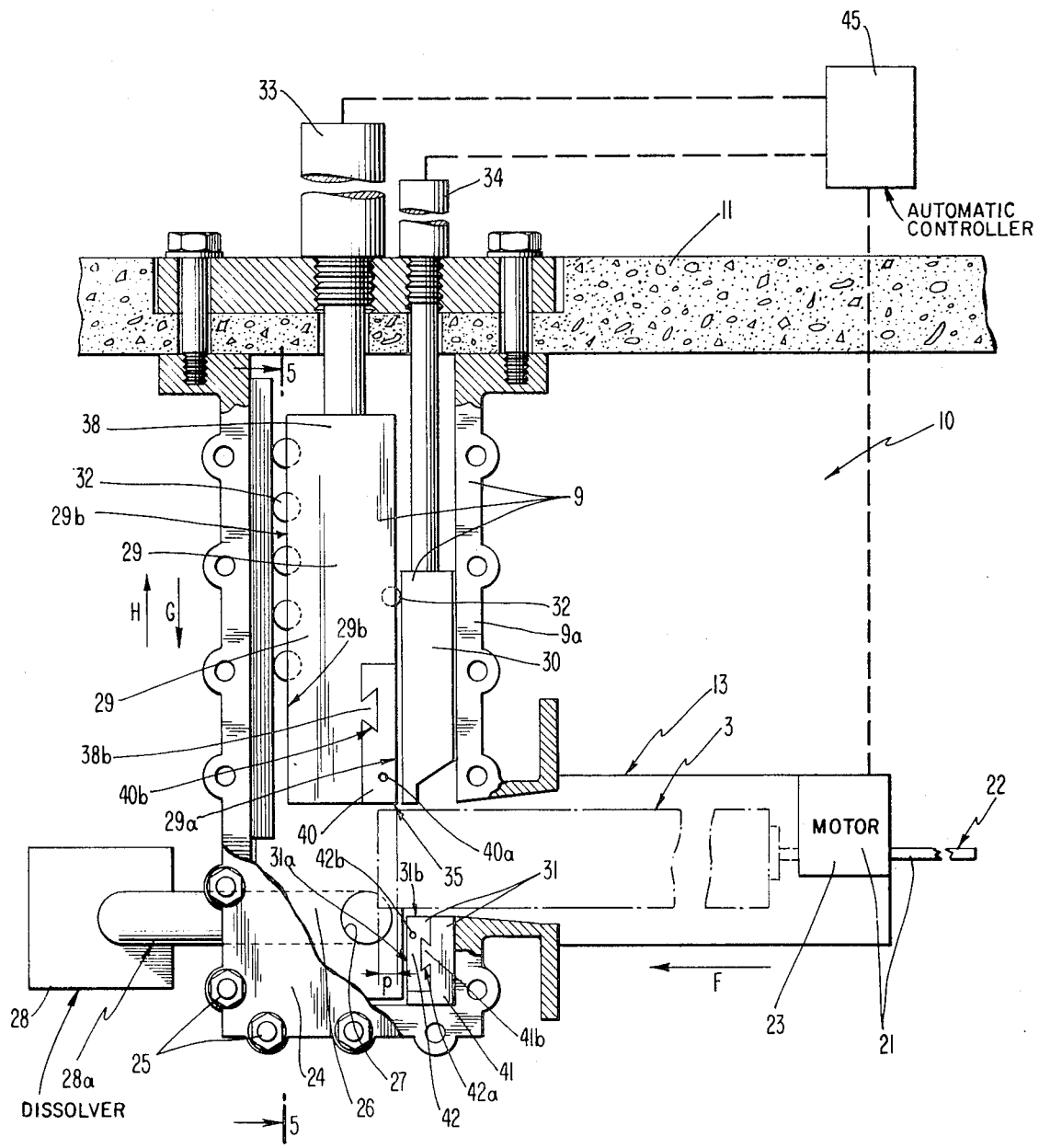
FIG. 4 is a plan view to a scale enlarged over FIG. 3, of the conventional shearing apparatus identified at 13, FIG. 3, parts being broken away to illustrate mechanism otherwise obscured.

With reference to FIG. 1 of the drawings, 1 identifies generally a combustible element consisting of two inert ends 2 and a component 3 comprising one or more cartridges 5 with combustible nuclear matter 4, see FIG. 1a, connected in a bundle by means of lateral tie rods 6. Component 3 and inert ends 2 are interconnected by means of longitudinal tie rods 7 consisting, if desired, of a suitable number of cartridges 5. These cartridges, made of stainless steel, for example, or of a zirconium alloy called "Zircaloy" may contain a natural or enriched uranium oxide combustible powder, used preferably in the form of pellets; however, it is also possible to employ cartridges having an external jacket 5a (FIG. 1A) and an internal jacket 5b, preferably of aluminum, magnesium or magnesium alloy, these jackets enclosing between them a metal or combustible alloy tube 4 made of uranium or uranium alloy, for example.

In FIG. 2, the connection between component 3 and inert ends 2 is simultaneously provided by jacket 8, usually pierced by holes 8a and providing a tubular tie rod and a longitudinal tie rod 7 and cartridges 5.

When it is desirable to remove combustible nuclear material from the cartridges, successive or simultaneous cutting of inert ends 2 is commenced, in order to remove component 3 containing the combustible nuclear material. This component is then cut into bits in shears 9 (FIG. 3), these bits being then transported to the corrosive liquid bath. The corrosive liquid may be nitric acid, supplemented by hydrofluoric acid, if desired, when natural or enriched uranium oxide is encased in stainless steel or "Zircaloy" cartridges, which are almost unaffected by nitric acid. On the other hand, sodium hydroxide solution may be employed when it is desirable to dissolve aluminum, magnesium or magnesium alloy cartridges containing a bar or tube of uranium alloy, which is insoluble in this solution.

It should be noted, that in the first case, it is essential to cut the cartridges into sections, so that nitric acid comes into contact with the combustible powder. In the second case, it is also desirable to feed the cartridges in sections, in order to reduce the volume of the sodium hydroxide bath.

The processing equipment in which the aforementioned operations are conducted consists of a cell 10 (FIG. 3), surrounded by biological protection chamber 11 and containing a mechanical saw 12 and shears 9 connected to magazine 13. Handling equipment, in itself well-known and not shown for that reason, is used to transport combustible elements 1 to mechanical saw 12, in order to remove inert ends 2 (FIGS. 1 and 2) from component 3. This component is then sent to magazine 13 of shears 9 by means of handling device 14, comprising, for example, a mechanical hoist 15 and loading platform 20. It should be noted that the platform or magazine is equipped with a feed device 21 (FIG. 4) serving to move (Arrow F) element component 3 along a predetermined path, step by step through a distance of 20 to 30 mm each. This feed device is of a type well-known in itself and for this reason has been summarily represented as a ram 22, driven by motor 23.

Again in this FIG. 4, it is apparent that shears 9 connected to chamber 11 comprises a component 9a, the top of which is closed by cover 24 connected by appropriate means 25 and its bottom part by base 26, where there is a discharge outlet 27 connected to a dissolver or battery of dissolvers 28 via pipeline system 28a. Inside shears component 9a, there is a sliding tool 29 and a hold-down plate 30 connected to each other and to fixed shears stop 31. The tool has a plane face 29a located opposite the hold-down plate and is terminated by at least one inclined stepped ramp 35 (FIGS. 5, 6 and 7), and another face 29b located opposite shears component 9a, rollers 32 being advantageously interposed between this component, the tool and the hold-down plate. Stop 31 also has a plane face 31a arranged on the extension of plane face 29a of the tool, and a face 31b connected to the hold-down plate. Jacks 33 and 34 serve to activate tool 29 and hold-down plate 30; these jacks, preferably hydraulic, are capable of developing 250 and 60 tons respectively when the combustible elements have a cross-section on the order of 200—250 mm. Moreover, all these values are given for illustrative purposes and are in no way limiting.

FIG. 5 shows a conventional type of tool 29 having steps distributed along a single inclined ramp 35. This ramp is arranged at the bottom of the tool, in order to facilitate dropping combustible nuclear material into discharge outlet 27, roller carriages 36 and 37 being interposed between tool 29, base 26 and cover 24 of the shears, to permit sliding the device into the shears.

It should be noted that machining work on and the replacement of the tool are simultaneously and advantageously facilitated by designing it in the form of blade holder 38 and blade 40, to which plane face 29a (FIG. 4), terminated along inclined ramp 35, is secured. This blade, resting on stop 38a of the blade holder and having gripper units 40a, preferably comprising a tapped hole, has, for example, one or more mortises 40b, where blade holder tenons 38b are engaged. Similarly, stop 31 may consist of a bushing 41 attached to shears component 9a and a bushing 42 resting on stop 41a attached to the bushing holder, tenons 41b being used in the bushing support being engaged by mortises 42a used in the bushing. Premature displacements of blade 40 in the blade holder and bushing 42 — having gripper units 42b similar to components 40a — are avoided, for example, thanks to carriage 36 and protrusion 43 of cover 24.

When it is desired to replace blade 40 and bushing 42, we start by drawing back cover 24 and carriage 36 with the help of a handling device, for example (not shown), with which the treatment cells are generally rigged. This handling device is then reemployed to screw the threaded rods (not shown) into holes 40a and 42b of the blade and bushing, in order to lift them out of the shears.

In one construction variant (FIG. 6), tool 29 or blade 40 have two inclined ramps 35 and 35a.

In another variant (FIG. 7), the steps are distributed over two parallel, symmetrically arranged ramps 35 and 35b, in the same way as mortise 40b, with respect to a center 44, the presence of a casing 45, also assembled on blade holder 38 by means of a tenon and mortise combination (no reference), thus permitting, as in the case of the tools in FIGS. 5 and 6, the assembly or removal of blade 40, and replacement of ramp 35 by ramp 35b.

The above-described shears operates as follows:

Component 3 is moved (Arrow F) by feed device 21 into magazine 13, until the forward end of this component travels a distance p beyond plane face 29a of the tool, the rear end of the component being in contact with ram 22. By starting jack 34 (Arrow G), cartridges 5 of combustible material are pressed one after the other between hold-down plate 30 and face 31b of stop 31. Cartridges 5 are then cut by tool 29, driven by jack 33, into sections that are collected in the dissolver or battery of dissolvers 28 connected to discharge outlet 27.

Jacks 33 and 34 now slide tool 29 and hold-down plate 30 in retraction as indicated by Arrow H, component 3 being moved forward again (Arrow F) by device 21 over a distance p. As mentioned above, cartridges 5 are then pressed between hold-down plate 30 and stop 31 and then cut by tool 29.

All the aforementioned operations can be — and usually are — automatic, jacks 33 and 34 and motor unit 23 being driven — as shown schematically by the dotted lines — by means of governor 45, which needs no description, since it lies outside the general scope of the invention.

On the other hand, it is important to note that the presence of a lateral tie rod 6 (FIG. 1) prevents cartridge sections from detaching from one another. When tool 29 actually begins to cut the combustible element in front of and behind a transverse tie rod — or even at the location of this tie rod — the latter continues to hold the cartridge sections together, thus forming a mass having dimensions similar to those of section 3a (FIG. 5) of a combustible element after compression between hold-down plate 30 and stop 31. A mass of this type may obstruct dissolver 28 or pipe-line 28a connecting shears discharge line 27 to dissolver 28. Furthermore, if this dissolver has a conveyor (not shown) traveling into a liquid corrosive bath designed to dissolve cartridges 5 or combustible nuclear material 4, this mass may leave the bath without completely dissolving the combustible nuclear material.

The aforementioned drawbacks are still further aggravated when it is desired to use shears 9 to cut up component 3 of a combustible element belonging to the type shown in FIG. 2. In this case, component 3 is still surrounded by jacket 8 after removing inert ends 2 of the element in saw unit 16. When jack unit 34 commences to press cartridges 5 between hold-down plate 30 and stop 31, this jack also compresses jacket 8 against cartridges 5. The result is that every time tool 29 is pushed forward by jack 33 and begins to cut into component 3, a mass is formed consisting of a jacket annulus around the cartridge sections. Consequently, the processing equipment (FIG. 3) should have a disassembling device 46 to remove cartridge bundle 5 from jacket 8, transportation of component 3 between machine 12, disassembly device 46 and loading platform 16 being achieved, for example, by hoist 15. In any event, it should be noted that the disassembly device will not remove lateral tie rods 6 from component 3.

We shall now describe an invention shears and demonstrate how the above-mentioned drawbacks can be eliminated.

In one of its embodiments (FIGS. 8, 9 and 15), shears 29 has, apart from plane face 29a, terminated by at least one stepped inclined ramp 35, another plane face 29c having one or more projections 47 with edge 47a, the distances separating face 29a and 29c and edge 47a of the projection or projections having the same value P greater than the p traveled when ram 22 impels component 3 when device 21 (FIG. 4) is operating. The reference 29a makes it possible, therefore, to designate the plane face bordering inclined ramp 35 and edge 47a of the tooth or teeth 47 at the same time, this edge and this plane face forming on the tool, parts projecting with respect to the hollow part of this tool comprising plane face 29c.

The shears shown in FIGS. 8 and 9 operate as follows:

As mentioned above, component 3 is moved into magazine 13 (FIG. 4), so that the front end of this component travels a distance $p$ — in the direction of Arrow F — past plane face 29a of the tool, the rear end of the component being in contact with ram 22. Operation of jack 34 then permits, as described above, cartridges 5 with or without lateral tie rod 6 (FIG. 8) or jacket 8 (FIG. 9) to be pressed between hold-down plate 30 and stop 31; but when jack 33 (Arrow G) is started, projection 47 begins to dig a cut 48, indicated in summary fashion in FIG. 9 cartridge bundle 5 and in lateral tie rod 6 (FIG. 8) or in jacket 8 (FIG. 9). Tool 29 continues to advance in the direction of Arrow G, thus allowing cartridges 5 to be cut into sections and, if necessary, lateral tie rod 6 and jacket 8, already separated into two parts by cut 48 made by projection 47. The result is, that when the two parts of the tie rod and jacket squeeze against sections of cartridges 5, the two masses 3a (FIG. 9) of resulting sections have dimensions less than section 3a (FIG. 5) of the front end of the element after compression between hold-down plate 30 and stop 31.

In the embodiment shown in FIGS. 8 and 9 of the drawings, the aforementioned projection is formed by free end 47a, preferably rectangular, of a tooth 47, whose other end 47b, set in preferably rectangular hole 49 drilled in tool 29', is immobilized by one or more screws 50.

In the FIG. 10 variant, tool 29 consists of two teeth, whose ends 47b are set in recesses 49 made in tool 29, immobilization of these teeth being assured by means of bar 51, fitted with screws 50 and fastened to tool 29 by appropriate means 52, e.g.studs and nuts, as shown in the drawing. It should be noted that these screws have a knurled knob on their free end 50a (FIG. 11) and a threaded section 50b of screw diameter $d$, connected to tool 29 (FIG. 8) or in bar 51 of this tool (FIGS. 10 and 11), where a corresponding thread has been tapped, the other end 50c of this thread being preferably cylindrical and having a diameter $d_1$ less than $d$. In case of excessive tightening of teeth 47, this prevents crushing the thread of screw 50 and damaging the thread of the tool or bar when screw 50 is removed.

In another variant (FIG. 12), tool 29 consists of three teeth 47, so that the masses of cartridge sections formed during the cutting operation on the element have smaller dimensions than when the tool has a single tooth (FIG. 9). Moreover, according to the invention, a predetermined number of teeth, exceeding three, can be attached to this tool, in order still further to reduce the dimensions of the masses of cartridge sections obtained from the shears; but these methods of attachment, shown in FIGS. 9, 10 and 12, are difficult to realize, the increased number of teeth actually resulting in increased number of holes or recesses 49 in the tool and reducing cross-section of teeth 47, thus seriously weakening them.

This disadvantage is overcome, however, by equipping the tool with holes 49 located in several planes perpendicular to the direction of tool slide indicated by Arrows G and H. These holes are, for example, arranged parallel to single ramp 35 (FIG. 13) of blade 40, or even staggered, as shown in FIG. 14, blade 40 thus having, if desired, two inclined stepped ramps 35 and 35a. Attachment of each tooth 47 is ensured by a respective screw 50 (FIG. 14) by sinking the teeth in under pressure, electronic bombardment (FIG. 13), etc. It should be noted, that in the last two cases mentioned, end 47b of teeth 47 and holes 49 are preferably cylindrical.

These holes may also be truncated (FIG. 15), as well as end 47b of teeth 47, the locking of these teeth being ensured by nut 53 screwed on threaded stud 47c joined to 47b.

Whatever the method adopted for attaching these teeth, it is, nevertheless, convenient to use a tool comprising a blade holder 38, to which tenons 38b (FIG. 8) or mortises 38c are attached (FIG. 15) and a support 54, the bottom of which rests on stop 38a (FIG. 9). This support has a side 55, where mortises 54a(FIG. 8) or tenons 54b (FIG. 15) are formed, the latter joining with tenons 38b or mortises 38c, and an upper part having knob 54c (FIG. 8) and preferably a tapped hole. The other side 56 of this support has a part 56a capable of extending face 29a of blade 40 and another part — comprising plane face 29c of the tool — to which teeth 47 and blade 40 are attached. The two parts 56a and 29c of this support are connected along a surface 56b, to which blade 40 is attached, attachment of this blade to support 54 being achieved by suitable means 57, e.g. brazing (FIG. 9), screws (FIG. 13), etc.

Actually, it is unnecessary to mount blade 40 on support 54 by means of the mortise and tenon assembly similar to that used in the conventional embodiment shown in FIG. 4, the raising of the support equipped with teeth 47 and blade 40 which are particularly susceptible to wear can be accomplished, for example, — once lid 24 and carriage 36 have been disassembled by the aforementioned handling device — by attaching a threaded shaft (not shown) in hole 54c.

It is well to note, however, that when blade 40 consists of two parallel ramps 35 and 35b (FIG. 12) symmetrical with respect to center 44, attachment device 57, preferably consisting of screws, should be removable and symmetrical with respect to center 44, so that the blade can return and ramp 35b can be used when blade 35 is in use.

Moreover, preliminary tests have shown that formation of the groove or grooves 48 is improved when stop 31 or bushing 42 have on their face 31b one or more notches 60 (FIGS. 8 and 9) situated on the extension of the projection or projections 47a along the direction of Arrow G, these notches being preferably made by fraising or milling. Activation of hold-down plate 30 results in pressing cartridges 5 and tie rod 6 (FIG. 8) or jacket 8 against stop 31 or bushing 42, thus marrying (FIG.

16) notches 60 to the tie rod or to the jacket, or the tie rod and the jacket. When the tool is now activated in the direction of Arrow G, projections 47 of the tool come opposite notches 60, then pass them, thus removing parts of the jacket and tie rod that might still jam grooves 48. Consequently, the invention shears ensures division of the cut part of component 3 into a number of cartridge section pieces 3a greater than the number of projections or teeth on the tool.

In one variant (FIG. 17), tool 29 has projecting parts 47a — on which above-mentioned face 29a is reduced — separated by grooves 61 having a base or hollow part located on face 29c, and for this reason designated by the same reference, the projecting parts and the bottoms of the grooves terminating along ramp 35 (FIG. 18) or along ramps 35 and 35a (FIG. 21). Stop 31 also has projecting parts 62 separated by grooves 63 having a base situated on face 31a, and for this reason designated by the same reference, these grooves and projecting parts 62 being arranged respectively in the extension of projecting parts 47a and grooves 61 of the tool. The result is, that when the tool is slid in the direction of Arrow G, projecting parts of the tool and stop penetrate the grooves of this stop and this tool.

We shall now describe the operation of the invention shears shown in FIGS. 17 to 26, by assuming that component 3 is pressed between hold-down plate 30 and stop 31, after this component has moved (Arrow F), due to the action of feed device 21 (FIG. 4), the front end of this component having traveled a distance p beyond projections 47a.

When the tool is advanced in the direction of Arrow G, these projections sink into grooves 48 (FIG. 18) of depth p at the front end of component 3, bottom 29c of grooves 61 exerting no effect. Tie rod and jacket portions of the cartridges first occupy the places in the grooves, are driven into grooves 63 of stop 31, after having been separated from this component when projecting parts of the tool and stop penetrate the grooves of this stop and tool. Continued tool advance in the direction of Arrow G then permits expulsion of tie rod and jacket cartridge parts from stop 31 and causes them to fall through discharge outlet 27 into the dissolver or battery of dissolvers 28 (FIG. 4).

Tool and hold-down plate are now slid in the direction of Arrow H, the component being advanced again (Arrow F) a distance p by device 21, then pressed between stop 31 and hold-down plate 30. Progression of the tool in the direction of Arrow G thus permits it to reach the bottom of grooves 48 and cut parts 3a of the components separated by these grooves, by means of bottom 29c of grooves 61, if distance P is less than twice distance p.

If this is not the case, component 3 is advanced (Arrow F) as many times as it is necessary for base 29c to be able to cut parts 3a, this advancing operation being preceded by the aforementioned movement of hold-down plate and tool in the direction of Arrow H.

As a result of the above, the invention tool can slash component 3 into pieces having diameters smaller than grooves 61, tie rod 6 and jacket 8 being pinched and then cut between the tool and stop 31, as the tool moves in the direction of Arrow G. This obviates formation of cartridge section pieces capable of plugging dissolver 28 (FIG. 4) or pipe-line system 28a and hindering dissolution of combustible nuclear material or the cartridges.

As seen in FIG. 17, grooves 61 can be rough-hewn by hammering face 29a of shear tool 29 and then machining with a fraise, grinding wheel, or circular tool 58, thus giving shears tool 29 an appropriate hardening treatment. In this case, contrary to ramp 35, grooves 61 have a rounded part 61a, preferably fitting a recess 29e in the hold-down plate and actually helping to remove, when necessary, fragments of combustible element material from the tool.

Similarly, grooves 63 can be rough-hewn by hammering on face 31c of the stop located on the extension of bottom 29c of grooves 61 and hence, at a distance P from face 31a of this stop. Grooves 63 are then milled with tool 58 or the like, the stop thus receiving a suitable hardening treatment. It should be mentioned that the rough-hewing and machining of these grooves are facilitated by attaching the stop to the inside of component 9a by a weld 31d, swaging, etc.

In a first variant (FIGS. 18–21), the part of the tool situated opposite the hold-down plate 30 and the stop 31 has a slot 64, consisting of walls 64a, 64b, 64c and bottom 29d. Steel bars 65 and 66, preferably stainless, and having two thicknesses, whose difference is equal to above-mentioned distance P, one bar 65 extending along at least one bar 66 and vice versa, are brazed to these tool walls and bottom. Furthermore, one of ends 65a, 66a of these bars touches wall 64d of slot 64, the other ends 65b, 66b of these bars constituting inclined ramp 35 (FIG. 18) or inclined ramps 35, 35a (FIG. 21). The result is, that a tool assembled in this manner and in accordance with the invention has a least one inclined ramp 35, projecting parts 47a consisting of bars 65 and grooves whose bottom is made up of bars 66. A slot 67, comprising walls 67a, 67b, 67c and a bottom 31d, may be made in face 31b of the stop and in that part of the stop adjacent to this face. Steel bars 68 and 69, preferably stainless, and having two thicknesses, whose difference is equal to the difference P, one bar 68 extending along at least one bar 69 and vice versa, are brazed to these tool walls and bottom. Furthermore, one of ends 68a, 69a of these bars touches wall 67a of slot 67, the other ends 68b and 69b of these bars extending hold-down plate face 31b. An invention stop assembled in this manner comprises projecting parts 62 formed by bars 68 and grooves 63, whose bottom 31a is made up of bars 69.

It should be noted that the sections of bars 65 and 68, as well as those of bars 66 and 69, may be identical, but width of these latter bars should be greater than bars 65 and 68, in order to maintain interplay between tool and stop.

In a second variant (FIG. 21), screws 70 serve to fix on the tool and stop, bars 65, 66, 68 and 69, comprising here a component made of ordinary steel, where screws 70 pass through, and ends 65a, 65b, 66a, 66b, 68a, 68b, 69a and 69b made of a material harder than ordinary steel, e.g. tool steel or metal carbide. Used bars can be replaced and bars also turned end-on-end, in order to use end 65a, 66a, 68a and 69a when ends 65b become dull after prolonged use.

The same applies when tool and stop bars have tenons 71, 72, 73 and 74 working together with mortises 75, 76, 77 and 78 incorporated in the tool and stop. As shown in the drawing (FIG. 22), mortises 76 and 78, serving to attach bars 66 and 69 respectively, are preferably placed at distances equal to the aforementioned P from mortises 75 and 77, serving to attach bars 65 and 68, which are then of identical thickness as bars 66 and 69. Moreover, casings 80 of predetermined thickness $i$, preferably brazed on one of the series of rods of the tool or stop, can be inserted between the bars in such a way as to provide grooves 61 or 63 (FIG. 20) having widths greater than projections 47a and 62. This makes it possible to design an invention tool and stop by fastening between this tool and stop, identical bars, said tool having a single inclined ramp 35 (FIG. 24) or two inclined ramps 35 and 35a (FIG. 23).

It should be further noted that it is advantageous (FIGS. 25 and 26) to reserve before ends forward of projections 47a, or before ends 65b, 66b of bars 65, 66, and behind the rear ends of projections 47a, or behind ends 65a, 66a of bars 65, 66, areas or surfaces 81, 82 located at a distance greater than P from projections 47a, i.e. behind with respect to bottom 29c of groove 61; the expressions "before," "behind," "forward" and "rear" being referred to by the direction indicated by Arrow G. This facilitates removal of portions of cartidges, jackets or tie rods torn from component 3, from grooves 61 and rubbing of tool surface 81 against this component is avoided when bottom 29c of groove 61 cuts it. These surfaces 81 and 82 may also be placed at the same distance from bottom 29c of the grooves and also split into a single surface 81a enclosing grooves 61 and projections 47a, tool face 29a being thus reduced to these projections.

Similarly, on stop 31, it is advantageous to reserve an area 83, located at a distance greater than P from projections 62 — i.e. behind with respect to bottom 31a of grooves 63 — and in the neighborhood of the ends of the groove farthest from the tool. This surface, whose function is to facilitate removal from these grooves, sections of cartridges, jacket or tie rod cut from component 3 by tool 29, may extend along projections 62 or stop grooves 63, face 31a of this stop being thus reduced to the bottom of grooves 63.

In the FIG. 25 embodiment, where tool and stop are rough-hewn by hammering — as in the case of FIG. 17 — areas 81, 82 and 83 may be prepared during this hammering, the presence of these areas also having the advantage of facilitating the machining of grooves 61 and 63.

Finally, it should be noted, that as mentioned above, it is convenient to use a tool made of blade-holder 38 and support 54 attached to blade-holder 38 by tenon and mortise, grooves 61 being made in this support. Grooves 63 may also be included in bushing 42 attached by tenon and mortise to bushing-holder 41, assembly of this bushing holder and bushing 42 making up stop 31, as mentioned above.

Figure 22:
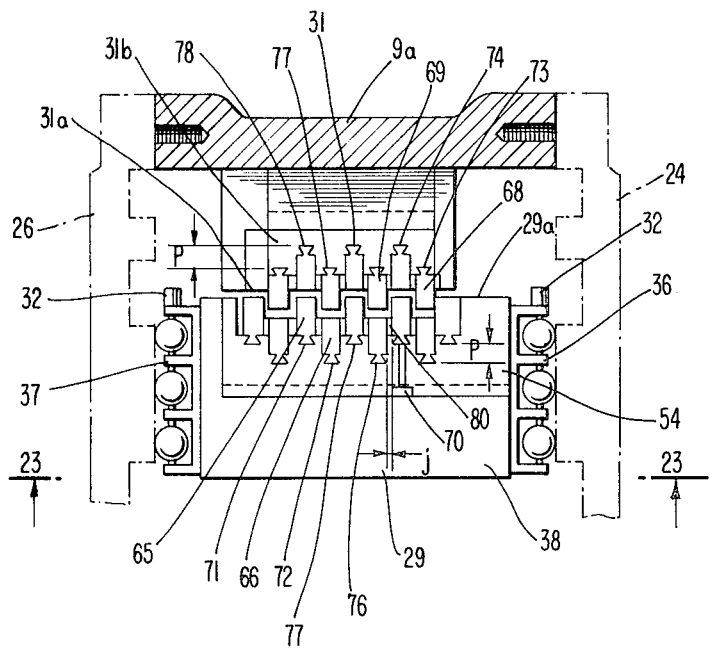
FIG. 22 illustrates a variant of the device of FIG. 19.
Figure 23:
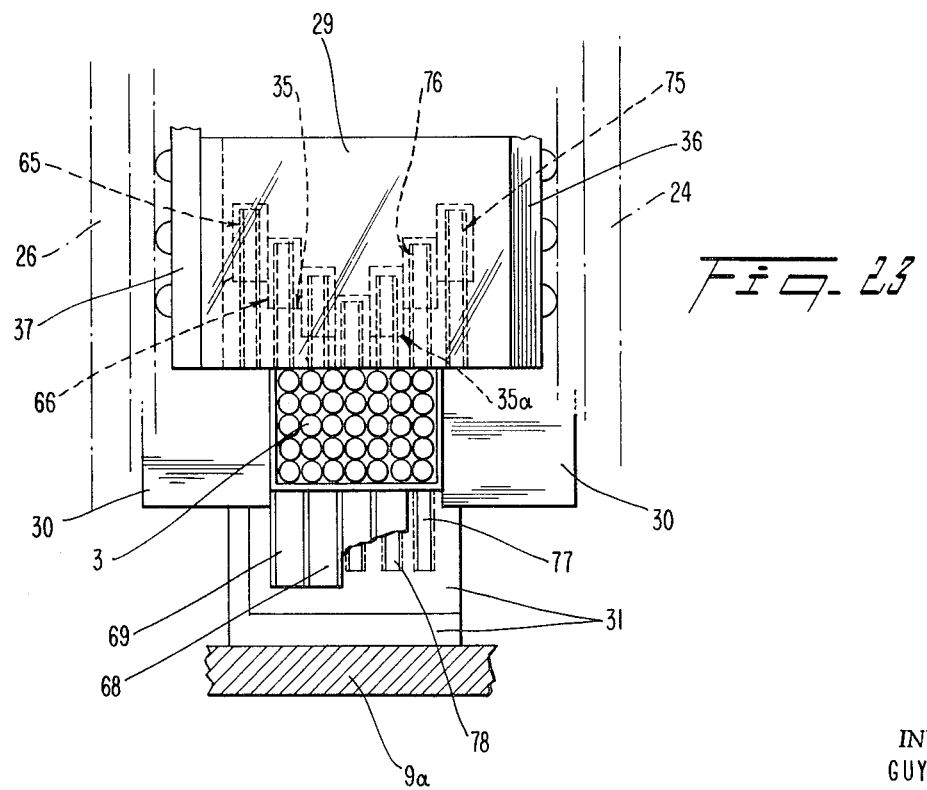
FIG. 23 is a cross-sectional view along line 23—23 of FIG. 22.

As seen in FIG. 24, for example, support 54 is equipped with tenon bars 65, 66 of equal length and analogous to those of FIG. 22. Ends 65b, 66b of these bars form inclined stepped ramp 35, their ends 65a, 66a forming parallel ramp 35b. Casing 84, connected advantageously to support 54 by tenon and mortise designated by reference 84a, and screws 85, permits immobilization of bars 65 and 66, this assembly of bars, support 54, casing 84, and assembly of support 54 on tool-holder 38 by tenon and mortise, not referred to in the drawing, in order to avoid cluttering it needlessly, being symmetrically arranged with respect to a predetermined emplacement center 44. The result is, that ramp 35 can be replaced by parallel ramp 35b by placing, for example — once cover (FIG. 19) and carriage 36 have been disassembled by the handling device mentioned above — a threaded rod (not shown) in hole 54c.

Moreover, it has been specified in the above description, that table 20 or magazine 13 (FIGS. 3 and 4) are equipped with a feed device 21 of a known type, serving to advance (Arrow F) component 3 of the combustible element a predetermined distance $p$.

This device (FIG. 27) may include, for example, a motor or motor reducer 86, equipped with starting device 86a connected to governor 45 by lines shown schematically in dotted form and capable of turning, by means of transmission device 87, comprising pinions 88 and chain 89, a shaft 90 going through protective housing 11. Pinion 91 is mounted on shaft 90 and works together with rack 22a (FIG. 28) attached to ram 22, this ram being mounted to slide on loading table 20 (not shown), or on magazine 13 (FIG. 27) by means of bearings 92. Furthermore, shaft 90 turns by means of gears 93, preferably consisting of pinions, wheel 94 having finger 95 in contact with electrical switch 96 connected to starter 86a of motor 86 by wires represented schematically by dotted lines.

It should be noted, that the assembly indicated by references 86–96 consists of aforementioned motor unit 23, wheel 94, depending on choice of devices 87, 93, and pinion 91 making a complete revolution when ram 22 advances a distance $p$, due to the action of motor 86.

Moreover, it is possible by disconnecting governor 45 and switch 96 from starter 86a, to operate motor 86 and ram 22 manually. Therefore, component 3 can be fed (Arrow F) into magazine 13 until its front end travels a distance $p$ (FIGS. 4 and 8) past plane face 29a, the rear end of this component being in contact with ram 22.

Figure 28:
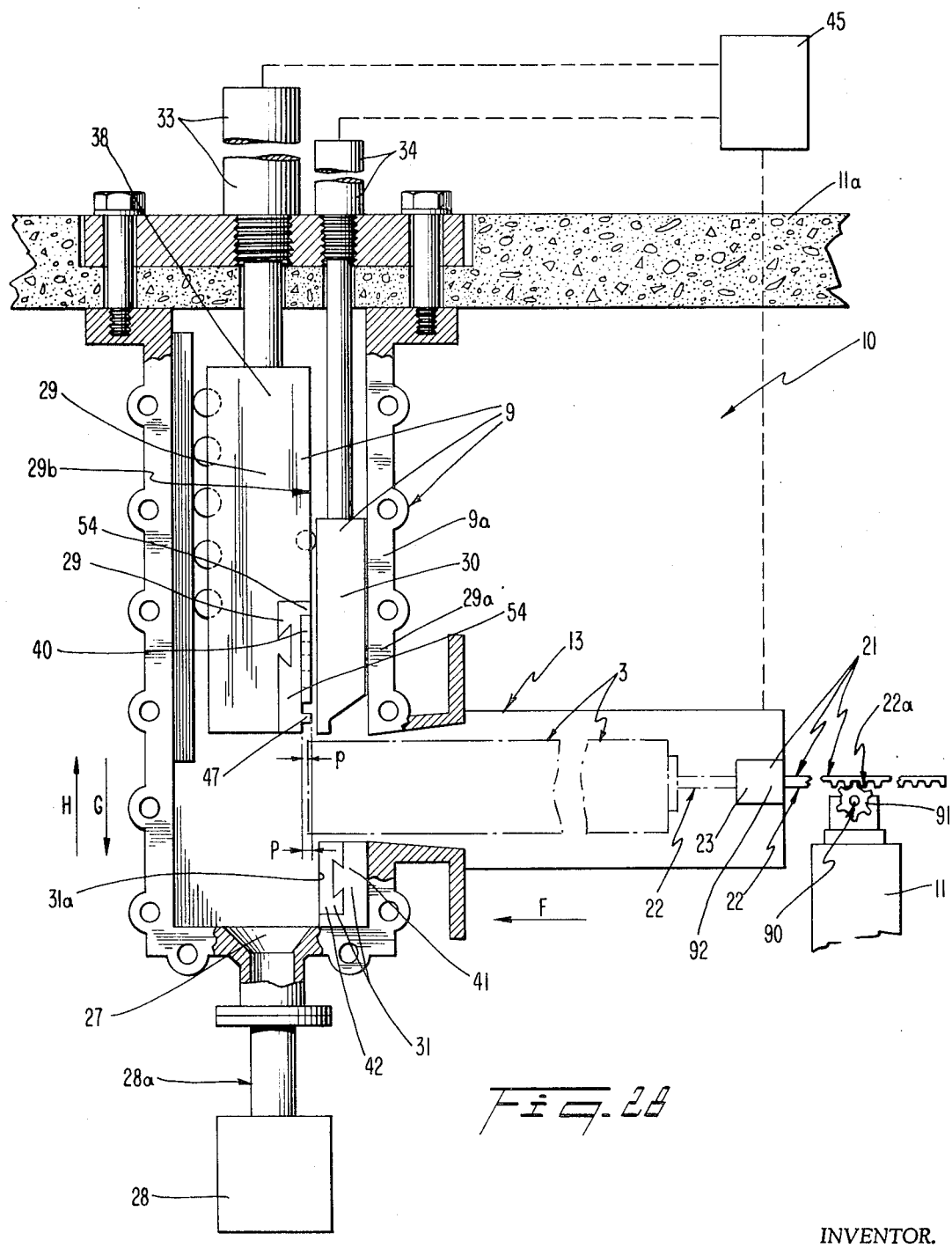
FIG. 28 is a detail plan view, partly in section, with cover parts removed, of shearing apparatus embodying the invention.

Finally, even though direction of slide of the tool and hold-down plate (Arrows F and G) have been represented as horizontal in FIG. 4, this direction may also be vertical, as illustrated as a variant in FIG. 28.

In this Figure, shears 9 is attached to a horizontal portion 11a of the protective housing, orifice 27 then being cut in body 9a of the shears and no longer in bottom 26 of this shears. Moreover, sliding direction of tool 29 and hold-down plate 30 is vertical, as represented symbolically by Arrows G and H.

Feed device 21 serves to feed component 3 (Arrow F) an aforementioned distance $p$, but its design remains identical or very nearly the same as that of FIG. 27 and it is possible, for example, according to the invention, to mount a projection 47 having height P greater than $p$, on the tool.

The various embodiments described above are in no way limiting and their designs may be modified, as desired, without departing from the scope of the invention.

I claim:

1. Apparatus for shearing an irradiated combustible element into fragments and comprising a feed device to advance the element in steps in and along a predetermined path, a fixed stop having a face on which the element can be supported, a hold-down plate movable in a direction normal to said path to clamp the element to the stop, a tool movable in said direction and having a first plane face adjacent to the hold-down plate, with edge shaped to form at at least one stepped ramp shearing edge contiguous to the plate, and a shearing tooth projection fixed with said tool and spaced ahead of said shearing edge in said direction, said projection having its free end substantially in the plane defined by said shearing edge, in movement in said direction, with the tool.

2. The apparatus of claim 1, wherein the tool has a second plane face spaced from said first plane face in said direction, at least one said shearing tooth projection having one end fixed to said second plane face, the free end of said one projection and said first plane face being essentially coplanar and spaced from said second plane face in a direction parallel with said path by a distance greater than that by which the feed device advances the element in one step.

3. The apparatus of claim 2, said one end of said one tooth projection being housed in a hole in said second plane face of the tool, and means removably fixing said one end of the projection within the hole.

4. The apparatus of claim 3, said one end of the projection and the hole being rectangular in transverse section said last-named means comprising a screw inserted in the tool and engaging the projection.

5. The apparatus of claim 3, said one end of the projection and the hole being circular in transverse section, said one end of the projection having a press fit in the hole.

6. The apparatus of claim 3, said one end of the projection being truncated and fitting a correspondingly-shaped hole in the tool, said truncated end having a reduced threaded extension, said last-named means comprising a nut threadedly engaging said extension.

7. The apparatus of claim 2, said second plane face of the tool being pierced by at least two holes situated in respective, spaced, parallel planes perpendicular to said direction of movement of the tool, and a plurality of shearing tooth projections each having one end detachably secured in a respective one of said holes.

8. The apparatus of claim 7, said first plane face of the tool forming a single stepped ramp shearing edge, said holes in the second plane face of the tool being arranged in a row parallel to said ramp.

9. The apparatus of claim 7, there being at least three holes in said second plane face, said holes being arranged in staggered relation with respect to said direction of movement of the tool, there being a shearing tooth projection secured in each said hole.

10. The apparatus of claim 7, the ends of at least two shearing projections being positioned in respective recesses in the tool, a bar affixed to the tool to span said recesses and two screws threaded through holes in the bar and having their ends engaging the projections within the respective recesses to immobilize said projections.

11. The apparatus of claim 4, one end of said screw having a knob and a threaded section having a predetermined thread shank diameter threaded through a hole in the tool, the other end of said screw engaging the projection and being cylindrical, and having a diameter less than the shank diameter of said threaded section.

12. The apparatus of claim 2, said tool comprising a blade-holder rabbetted to form a shoulder between first and second parallel surfaces offset in the direction of said path, a support attached by mortise and tenon connection to said blade-holder, within the rabbett, said support having two parallel plane faces defining said first and second plane faces respectively.

13. The apparatus of claim 2 the face of the stop on which the combustible element can be supported, having a notch coplanar with the path of movement of a tooth projection attached to said second plane face of the tool.

14. The apparatus of claim 2, the tool comprising a plurality of spaced projections defining between them grooves having a bottom spaced from the free ends of said projections by said distance, said stop having spaced projections defining between them grooves, each groove of the stop being located to receive a respective projection in movement of the tool, the projections and grooves of the tool forming at least one stepped ramp.

15. The apparatus of claim 1 said first plane face being formed with integral spaced parallel grooves, each contiguous pair of grooves defining between them, a projection extending parallel with said direction, said projections having ends normal to said first plane face and collectively defining at least one stepped ramp inclined with respect to said direction.

16. The apparatus of claim 15, the ends of the grooves remote from said stepped ramp being rounded for cooperation with a recess in the contiguous face of the hold-down plate.

17. The apparatus of claim 14, the tool comprising a housing, said projections on the tool being formed by two series of bars attached to said housing, said bars having different thicknesses, whose difference is equal to said distance, the other ends of the bars forming said stepped ramp, said ramp being inclined with respect to said direction of movement of the tool and hold-down plate.

18. The apparatus of claim 14, said stop comprising a housing, said projections on the stop being formed by two series of bars having alternately different thicknesses, said difference being equal to said distance, the other ends of the bars extending the face of the stop.

19. The apparatus of claim 17, the bars having only two sectional sizes, alternate ones having a thickness and width smaller and greater, respectively, than the thickness and width of the sectional size of the intermediate bars.

20. The apparatus of claim 17, said bars being brazed to the housing.

21. The apparatus of claim 17, said bars being of ordinary steel with the ends thereof of a material harder than ordinary steel, said bars being attached to the housing by screws passing through apertures in the bars.

22. The apparatus of claim 14, said projections comprising two series of identical bars each having a tenon on one end, fitting a respective one of a first and second series of mortises in the tool, each bar of one series being disposed between a respective pair of adjacent bars of the other series, the distance between said first and second series of mortises, measured parallel with said path, being equal to said distance.

23. The apparatus of claim 14, said stop comprising two series of identical bars each having a tenon on one end, each tenon fitting a respective one of two series of mortises in said stop, the distance between the mortises of one series and the other series of mortises being equal to said distance.

24. The apparatus of claim 22, each tenon of each bar being immobilized in its mortise by set screws.

25. The apparatus of claim 22, and linings of predetermined thickness brazed to one said series of bars of the tool and to one said series of bars of the stop.

26. The apparatus of claim 14, the tool having free planar areas located at the rear with respect to the bottom of said grooves, and bordering the ends of these grooves.

27. The apparatus of claim 14, the tool having a free planar area located in the rear with respect to the bottom of said grooves and surrounding these grooves and the projections of the tool.

28. The apparatus of claim 14, said stop having a free planar area located at the rear with respect to the bottom of said grooves thereof and bordering the ends of these grooves farthest from the tool.

29. The apparatus of claim 14, said tool comprising a blade-holder and a support assembled by mortise and tenon connection on the blade-holder, said projections formed by and between the grooves of the tool being formed in said support.

30. The apparatus of claim 14, said stop comprising a bushing-holder and a bushing fixed to the bushing-holder by mortise and tenon connection, said projections formed by and between said grooves of the stop being formed in said bushing.

31. The apparatus of claim 29, said projections being tenoned bars of identical length, rigidly attached to the support the ends of said bars forming two parallel stepped ramps inclined in said direction, the support and bar assembly being symmetrical with respect to a center line of the tool, parallel with said direction.

32. The apparatus of claim 31, said bars being fixed to the support by a lining assembled by tenon and mortise to the tool-holder, the support bars and lining assmbly being symmetrical with respect to said center line.

* * * * *